C. M. C. BARRETT.
POTATO DIGGING MACHINE.
APPLICATION FILED FEB. 2, 1917. RENEWED SEPT. 29, 1919.

1,321,782.

Patented Nov. 11, 1919.
4 SHEETS—SHEET 1.

Fig. 1.

Witnesses
Philip Terrell
Francis H. Bonnell

Inventor
C. M. C. Barrett

By D. Swift & Co.
Attorneys

C. M. C. BARRETT.
POTATO DIGGING MACHINE.
APPLICATION FILED FEB. 2, 1917. RENEWED SEPT. 29, 1919.
1,321,782.
Patented Nov. 11, 1919.
4 SHEETS—SHEET 2.
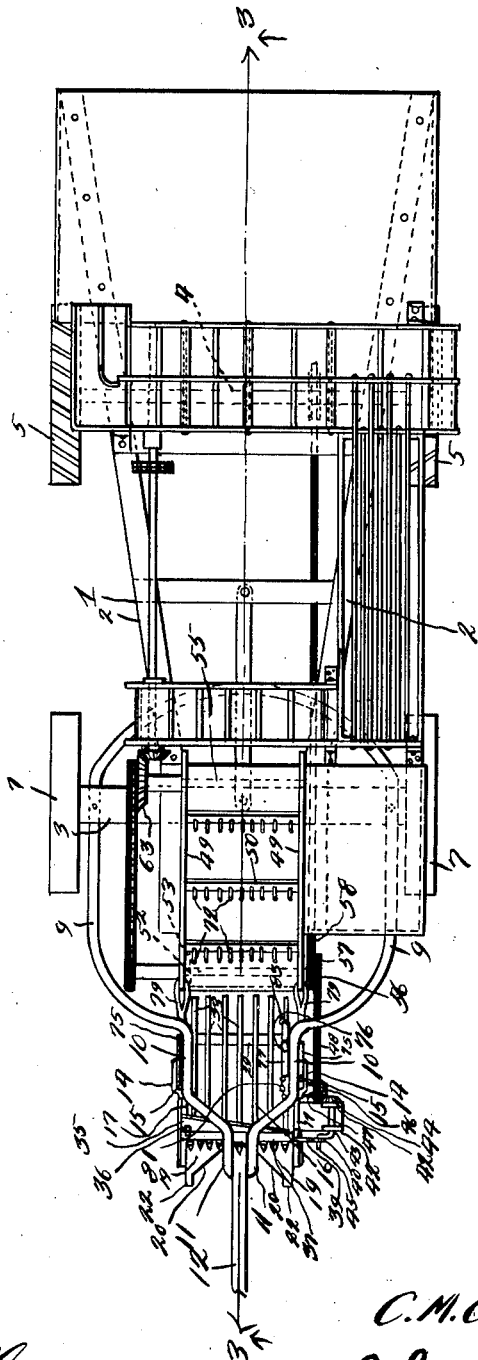

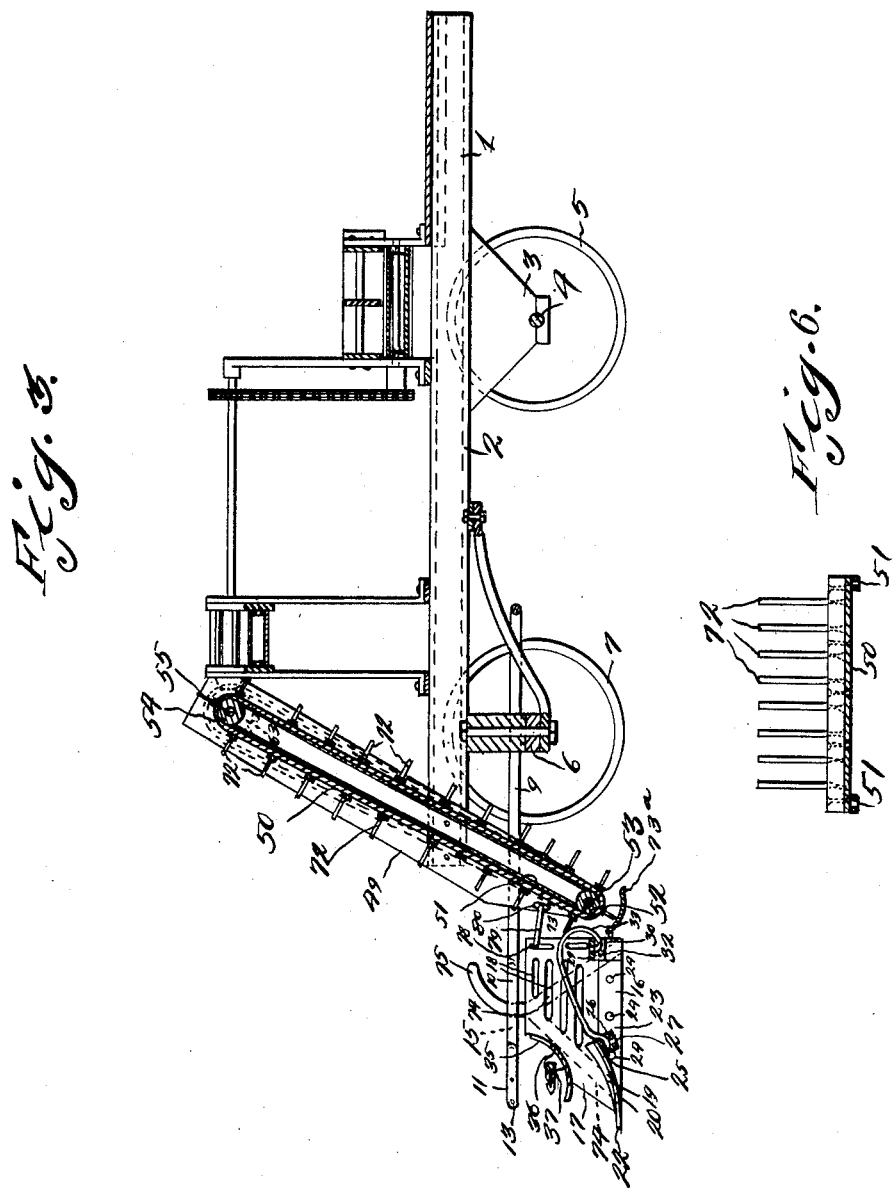

C. M. C. BARRETT.
POTATO DIGGING MACHINE.
APPLICATION FILED FEB. 2, 1917. RENEWED SEPT. 29, 1919.
1,321,782.
Patented Nov. 11, 1919.
4 SHEETS—SHEET 4.
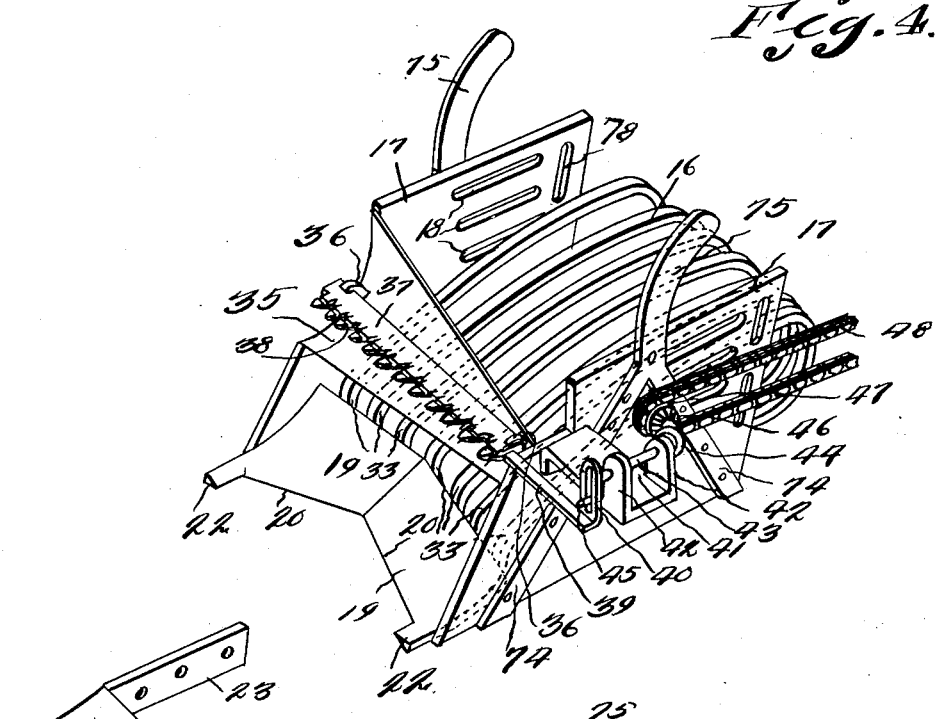
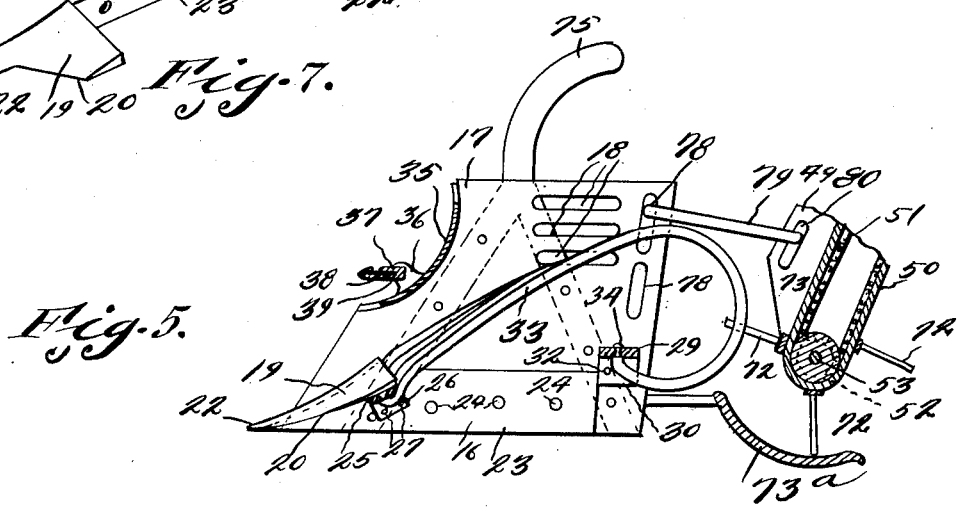

UNITED STATES PATENT OFFICE.

CASSIUS M. C. BARRETT, OF COUPEVILLE, WASHINGTON.

POTATO-DIGGING MACHINE.

1,321,782.  Specification of Letters Patent.  Patented Nov. 11, 1919.

Application filed February 2, 1917, Serial No. 146,170. Renewed September 29, 1919. Serial No. 327,302.

*To all whom it may concern:*

Be it known that I, CASSIUS M. C. BARRETT, a citizen of the United States, residing at Coupeville, in the county of Island, State of Washington, have invented a new and useful Potato-Digging Machine; and I do hereby declare the following to be a full, clear, and exact description of the invention, such as will enable others skilled in the art to which it appertains to make and use the same.

This invention relates to a new and useful potato digging machine, and one of the objects of the invention is to provide an improved digger for excavating the potatoes from the ground.

A further object of the invention is to provide means to be handled by the operator for raising or lowering the digger according to the size of the hills of potatoes.

A further object of the invention is to provide means on the digger for severing the vines, as the potatoes are excavated from the hills.

A further object of the invention is the provision of a digger having its digger end comprising blades, which are arranged partially V-shaped and have their forward cutting edges arranged V-shaped, thereby facilitating the digging of the potatoes.

One of the features of the invention is to construct the bottom of the digger of a series of bars connected to the rear portions of the digger blades extending upwardly and rearwardly and curving down and merging into forwardly extending parts, which are secured to a transverse bar of the digger member, so that the potatoes will travel upwardly and rearwardly, in order to be transmitted to the upwardly and rearwardly extending conveyer.

In practical fields, the details of construction may necessitate alterations falling within the scope of what is claimed.

The invention comprises further features and combination of parts, as hereinafter set forth, shown in the drawings and claimed.

In the drawings:—

Figure 1 is a view in side elevation of the improved potato digging machine constructed in accordance with the invention.

Fig. 2 is a plan view.

Fig. 3 is a sectional view on line 3—3 of Fig. 2.

Fig. 4 is a view in perspective of the digger member.

Fig. 5 is a sectional view through the same.

Fig. 6 is a detail sectional view of the conveyer 50, showing the projections 72.

Fig. 7 is a detail perspective view of one of the blades 19.

Referring more especially to the drawings, 1 designates a suitable frame, which may be constructed of any suitable shape. However, this frame comprises the base channel beams 2, which are mounted upon the forward axle of the machine, and have their rear portions provided with bearings 3 for the rear axle 4, upon the opposite ends of which the usual traction wheels 5 are mounted to rotate. The forward axle 6 may be of any conventional or suitable construction, and has forward supporting wheels 7, which may be mounted on said forward axle in any suitable manner, preferably, to be turned to the right or the left, in any suitable manner, not shown. Mounted on and carried by the forward axle is a bail shaped loop 9, the forward portions of the sides of which curve toward each other and merge into the straight portions 10, which are substantially parallel with each other. The portions 10 at their forward parts extend toward each other and terminate in the forward parallel extensions 11, between which a suitable tongue 12 is connected, as shown at 13, whereby the machine may be drawn along the rows of hills of potatoes. Secured to the outer faces of the portions 10, are the straps 14, which are so spaced from the portions 10 as to form guides 15.

In order to excavate the potatoes from the hills, an improved digger 16 is provided. This digger comprises a frame consisting of the opposite sides 17, which are provided with various elongated slots 18, in order to permit some of the dirt and the like from the potatoes to sift therethrough. This digger also consists of the blades 19, and these blades are arranged in V-shaped relation, so that their adjacent edges abut. The blades 19 have their cutting edges 20 extending toward each other in V-shaped relation, and the outermost forward portions of said blades have extensions 22, which constitute means to dig into the hills, in order to stir up the dirt about the potatoes, as they are scooped up by said blades. The outer side portions of said blades are bent to form the flanges 23, and these flanges are elongated and extend rearwardly and are secured at 24 to the sides 17 of the digger. In order to support and reinforce said blades, a transverse bar 25 is arranged under the blades to conform thereto. This bar 25, at both ends, terminates in end flanges 26, which are secured at 27 to the flanges of said blades, thereby producing a firm structure. A bar 29 provided with end flanges 30 is arranged between the sides of the digger and has its end flanges secured at 32 to the sides of the digger, at the rear portions of said sides. The bottom of the digger rearwardly beyond the blades comprises a series of upwardly and rearwardly extending rods 33. The forward ends of the rods 33 are bent downwardly slightly and forwardly and are riveted through the bar 25 and said blades. These rods 33, at their rear parts, curve downwardly and merge into forward extensions, which are riveted through the bar 29, as shown at 34. By this construction, the rods 33 are held rigid and firm. It is to be noted that owing to the blades 19 being disposed in V-shaped relation, the forward portions of said rods 33 will assume such positions as to form the bottom (which consists of the rods 33) of the digger V-shaped correspondingly to the blades 19, in order that the potatoes in passing up the bars 19 will be maintained toward the center of the digger. A tapering plate 35 curved in cross section has its opposite ends secured or connected in any suitable manner to the sides 17 of the digger. Rising from the opposite ends of this plate are the arms 36. Carried by the arms 36 is the shearing plate 37, which has a longitudinal opening 38, constituting a guide for the cutter bar 39. When this cutter bar reciprocates, the vines are severed, and by means of the plate 35, the several parts move toward one side of the machine. The plate 35 also acts as a guard to prevent the tops of the potato plants from falling over upon the rods 33. One end of the cutter bar 39 has an upwardly extending slotted arm 40. Extending laterally from one of the sides 17 of the digger, is a bracket 41, which is provided with the upwardly extending bearing arms 42, in which the shaft 43 is mounted. One end of this shaft 43 has a beveled gear 44, the other end of the shaft is provided with a crank 45 extending into the slot of the arms 40, so that when power is transmitted to the shaft 43, the cutter bar is reciprocated, so as to sever the tops of the potato plants, which fall upon the plate 35 and pass to one side of the machine. This beveled gear 44 meshes with the beveled gear 46, which has a gear 47 carried by and movable therewith. Passing about the gear 47 is a sprocket chain 48. Carried between the forward ends of the channel beams, is an upwardly and rearwardly extending conveyer frame 49 having a conveyer 50. The lower end of the conveyer has its sprocket chains 51 passing about the sprocket wheels 52 of the shaft 53. The sprocket chains 51 of said conveyer 50, at the upper end thereof, pass over the sprockets 54 of the shaft 55. On one end of the shaft 53, are sprockets 56 and 57, the sprocket 56 engaging and operated by the sprocket chain 48, while the sprocket 57 is engaged and operated by the sprocket chain 58, which passes over and is operated by the sprocket 59 of the rear drive axle 4. The potatoes, as they are gathered by the digger, and move upwardly and rearwardly, fall upon the projections of the conveyer 50, the part or member 73ª acting to catch the potatoes in case they miss the projections or fingers of the conveyer 50. These projections 72 project from the conveyer 50 and interengage between the rear curved parts of the rods 33. It is to be noted that the rear curved parts of said rods 33 are of such contour and are disposed in such relation with the lower end of the conveyer 50, as to provide a sort of a pocket, as shown at 73, and the projections 72 will convey the potatoes upwardly and rearwardly. A plate 73ª is disposed under the lower end of the conveyer 50, so as to catch the potatoes, in case none of the projections 72 are passing between the rear curved parts of said rods. Secured to the sides 17 of the digger are the forks 74 of the curved arms 75, which engage and are guided by the guides 15 formed by the straps 14. Pivoted at 76 to one of the portions 10 of the bail 9 is a T-shaped lever 77. It is to be noted that the sides 17 of the digger have slots 78 extending vertically, and these slots are engaged by the links 79, which in turn engage the slots 80 of the sides 49 of the conveyer 50. A link or a chain 81 is connected to the forward portion of one of the sides 17 of said digger, and is in turn connected to one of the arms of the T-end of said lever 77, so that when tilting the lever rearwardly, the digger may be raised or lowered. In other words, the depth of the digger into the hills of potatoes may be governed by said lever 77, there being a chain 83 connected to the other arm of the T-shaped lever to limit the forward movement of the same. When the digger is raised, the arms 75, coöperating with the guides 15, will guide the digger in its movement. A suitable platform 105 is supported at one side of the sides 49 of the conveyer 50, so that an operator may be supported thereon, for manipulating said T-shaped lever, to govern the depth of the digger, and to keep a close watch on the operation of the other parts of the machine.

The invention having been set forth, what is claimed as new and useful, is:—

1. In a potato digger, a digger member, comprising a scoop having sides, a transverse brace for the rear parts of the sides, digger blades arranged V-shaped to each other and having cutting edges disposed in V-shaped relation, and upwardly and rearwardly extending rods arranged in close parallelism and having their forward ends connected to the blade and having their rear parts curved downwardly and under and extending forwardly and connected to the brace.

2. In a potato digging machine, a digger, comprising sides, digging blades arranged V-shaped to each other and having cutting edges in V-shaped relation, said blades having downwardly extending flanges at their outer ends, said flanges extending rearwardly and being secured to said sides.

3. In a potato digging machine, a digger, comprising sides, digging blades arranged V-shaped to each other and having cutting edges in V-shaped relation, said blades having downwardly extending flanges at their outer ends, said flanges extending rearwardly and being secured to said sides, said blades near their sides at their forward portions having projections to cut into the hills of potatoes.

4. In a machine as set forth, a frame having supporting wheels, an adjustable digger on the forward end of the frame, said digger comprising sides, rear and forward bars connecting said sides, digger members secured to the forward bar consisting of plates having their meeting ends higher than their opposite outer ends, whereby said plates are arranged V-shaped, said plates having cutting edges arranged V-shaped, upwardly and rearwardly extending rods arranged in close parallelism and having their forward ends connected to the forward bar and disposed to conform to the V-shaped contour of the digger member and having their rear portions terminating in almost completely circular parts connected to the rear bar, whereby the potatoes will travel upwardly and rearwardly to be elevated.

5. In a machine as set forth, a frame, having supporting wheels, an adjustable digger on the forward end of said frame, said digger comprising sides, rear and forward bars connecting said sides, digger members secured to the forward bar and having forward cutting edges arranged V-shaped, said digger member comprising plates, the outer ends of which adjacent the terminals of the cutting edges are provided with projections having inner cutting edges, a tapering plate connecting the sides immediately above the digger members and being curved in cross section, whereby the tops of the potato bushes, as they are severed, may be cammed toward and to one side of the machine, upwardly and rearwardly inclined rods having their forward ends connected to the forward bar and arranged in a plane in conformity to the digger members, the upper rear ends of said rods terminating in almost completely circular parts extending rearwardly and downwardly and forwardly under the rear parts of the rod and having their terminals connected to the rear bar, means adjacent the rear under portions of said circular parts to catch the potatoes, whereby they may be elevated.

6. In a machine as set forth, a frame, having supporting wheels, an adjustable digger on the forward end of said frame, said digger comprising sides, rear and forward bars connecting said sides, digger members secured to the forward bar and having forward cutting edges arranged V-shaped, said digger member comprising plates, the outer ends of which adjacent the terminals of the cutting edges are provided with projections having inner cutting edges, a tapering plate connecting the sides immediately above the digger members and being curved in cross section, whereby the tops of the potato bushes, as they are severed, may be cammed toward and to one side of the machine, upwardly and rearwardly inclined rods having their forward ends connected to the forward bar and arranged in a plane in conformity to the digger members, the upper rear ends of said rods terminating in almost completely circular parts extending rearwardly and downwardly and forwardly and under the rear parts of the rod and having their terminals connected to the rear bar, means for loosely connecting the sides of the digger to the forward part of the frame, said forward part of the frame having guides, curved arms extending upwardly from the sides of the digger mounted in said guides and means for tilting the digger.

In testimony whereof I have signed my name to this specification in the presence of two subscribing witnesses.

CASSIUS M. C. BARRETT.

Witnesses:
J. J. JACOBS,
W. H. IVES.